(12) United States Patent
Zhang

(10) Patent No.: US 11,368,653 B1
(45) Date of Patent: Jun. 21, 2022

(54) PROJECTION-TYPE VIDEO CONFERENCE DEVICE

(71) Applicant: AMPULA INC., Bellevue, WA (US)

(72) Inventor: Yajun Zhang, San Jose, CA (US)

(73) Assignee: AMPULA INC., Bellevue, WA (US)

( * ) Notice: Subject to any disclaimer, the term of this patent is extended or adjusted under 35 U.S.C. 154(b) by 0 days.

(21) Appl. No.: 17/204,872

(22) Filed: Mar. 17, 2021

(51) Int. Cl.
*H04N 7/15* (2006.01)
*H04N 9/31* (2006.01)

(52) U.S. Cl.
CPC ............. *H04N 7/15* (2013.01); *H04N 9/3141* (2013.01)

(58) Field of Classification Search
CPC .................................. H04N 9/31; H04N 7/15
USPC ........................................... 348/14.01–14.16
See application file for complete search history.

(56) References Cited

U.S. PATENT DOCUMENTS

| | | | | |
|---|---|---|---|---|
| 2007/0260734 A1* | 11/2007 | Hsu | ........................ | H04L 43/045 709/227 |
| 2011/0066435 A1* | 3/2011 | Tomono | .................... | H04N 7/15 704/251 |
| 2013/0242207 A1* | 9/2013 | Hiramatsu | .............. | H04N 7/142 348/789 |
| 2017/0090272 A1* | 3/2017 | Ayaad | ....................... | B42F 13/40 |
| 2018/0027211 A1* | 1/2018 | Paripally | ................... | H04N 7/15 348/14.08 |
| 2018/0150148 A1* | 5/2018 | Yeung | ...................... | G06F 3/038 |
| 2021/0092215 A1* | 3/2021 | Matsubara | ............ | H04W 12/06 |
| 2021/0244274 A1* | 8/2021 | Claggett | .................. | A61B 3/12 |
| 2021/0295751 A1* | 9/2021 | Lee | ..................... | G06K 9/00671 |

* cited by examiner

*Primary Examiner* — Melur Ramakrishnaiah

(57) ABSTRACT

A projection-type video conference device comprises: a projection module configured to project a video image of a video conference, and comprising a housing with one or more status indicators thereon; a plurality of working modules configured to provide different services for the video conference; and a detection module configured to detect working statuses of the plurality of working modules, the detection module being connected to the plurality of working modules respectively, wherein the detection module detects the working statuses of the plurality of working modules in real time, and the working statuses are indicated by the one or more status indicators.

12 Claims, 2 Drawing Sheets

PROJECTION-TYPE VIDEO CONFERENCE DEVICE

TECHNICAL FIELD

The present disclosure relates to the technical field of video conference, and particularly to a projection-type video conference device capable of indicating working statuses.

BACKGROUND

In recent years, with the rapid development of video conferencing technologies, remote working, distant education and remote collaboration have become prevailed, and are becoming increasingly accepted by people. There are mainly two kinds of video conference systems. One kind is a cloud-based video conference system depending on software applications. Such a conference system mainly relies on software applications that are provided by terminals equipped with a display screen, such as computers or mobile phones, and enables video conferences to be implemented under organization and coordination of a cloud software service system. It is suitable for multiple individuals to participate in a group meeting, but is relatively dependent on network performance. In addition, for this kind of conference system, it is usually necessary to organize a conference in advance and issue an invitation. The other kind is a hardware-based video conference system. It enables an instant video conference to be established with another video conference system by combining cameras, TV screens, speakers, microphones and a conference controlling device (such as a computer). However, for this kind of conference system, it is expensive in terms of the various devices, and has poor flexibility in installation and usage, as well as large volume, which is not convenient to carry.

SUMMARY

There is provided a projection-type video conference device comprising:

a projection module configured to project a video image of a video conference, and comprising a housing with one or more status indicators thereon;

a plurality of working modules configured to provide different services for the video conference; and a detection module configured to detect working statuses of the plurality of working modules, the detection module being connected to the plurality of working modules respectively, wherein the detection module detects the working statuses of the plurality of working modules in real time, and the working statuses are indicated by the one or more status indicators.

In an embodiment, the projection-type video conference device further comprises:

a control module connected to the detection module, wherein the detection module transmits information on working statuses to the control module, and the control module controls the one or more status indicators based on the information to indicate different working statuses via light beams, colors or patterns with different visual effects.

In an embodiment, the projection module simultaneously displays the working statuses of the plurality of working modules in real time.

In an embodiment, the plurality of working modules comprise at least one of a camera module, an audio input and output module, a communication module, a battery module, a cloud service system, or a storage module.

In an embodiment, the plurality of working modules comprises a battery module comprising a rechargeable battery that supplies power to the projection-type video conference device, the detection module detects battery status of the rechargeable battery in real time, and the battery status is indicated in a form of a lamp post by the one or more status indicators.

In an embodiment, when the detection module detects in real time that a remaining power of the rechargeable battery reaches a preset threshold, the control module controls the projection module to reduce brightness of displayed image of the video conference video.

In an embodiment, the rechargeable battery is a detachable battery.

In an embodiment, the one or more status indicators comprise an LED light array, and the LED light array comprises a plurality of LED lights of different colors.

In an embodiment, the projection module uses a semiconductor light source.

BRIEF DESCRIPTION OF THE DRAWINGS

In order to more clearly explain the technical solutions in the embodiments of the present disclosure, drawings needed for the description of the embodiments will be simply introduced below. Obviously, the drawings mentioned hereafter just illustrate some embodiments of the present disclosure. For those of ordinary skill in the art, other drawings may also be obtained from these drawings without any creative work. In the drawings.

DETAILED DESCRIPTION OF PREFERRED EMBODIMENTS

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments thereof. Based on the embodiments in this disclosure, all other embodiments, obtained by those skilled in the art without any creative work, shall fall within the protection scope of this disclosure.

In a patent application filed on Feb. 4, 2021, with the application number U.S. Ser. No. 17/159,174, the applicant provides a projection-type video conference system including: a video conference device and a cloud service system, wherein the cloud service system is configured to provide the video conference device with services, and wherein the video conference device includes: a camera module for acquiring image information of a conference scene and generating a conference video; an audio input module for collecting voice signals of the conference scene, the voice signal including a recognizable voice command; a projection module for displaying the conference video; wherein the video conference device can recognize the voice command, and based on the voice command, perform operations corresponding to the voice command. The projection-type video conference system can perform voice control on the video conference device, has high integration, and is convenient to carry.

In order to further facilitate participants in the video conference to be aware of the working status of the video conference device including one or more working modules, and to improve the use experience of the video conference device, the present disclosure improves the video conference device.

Figure 1:
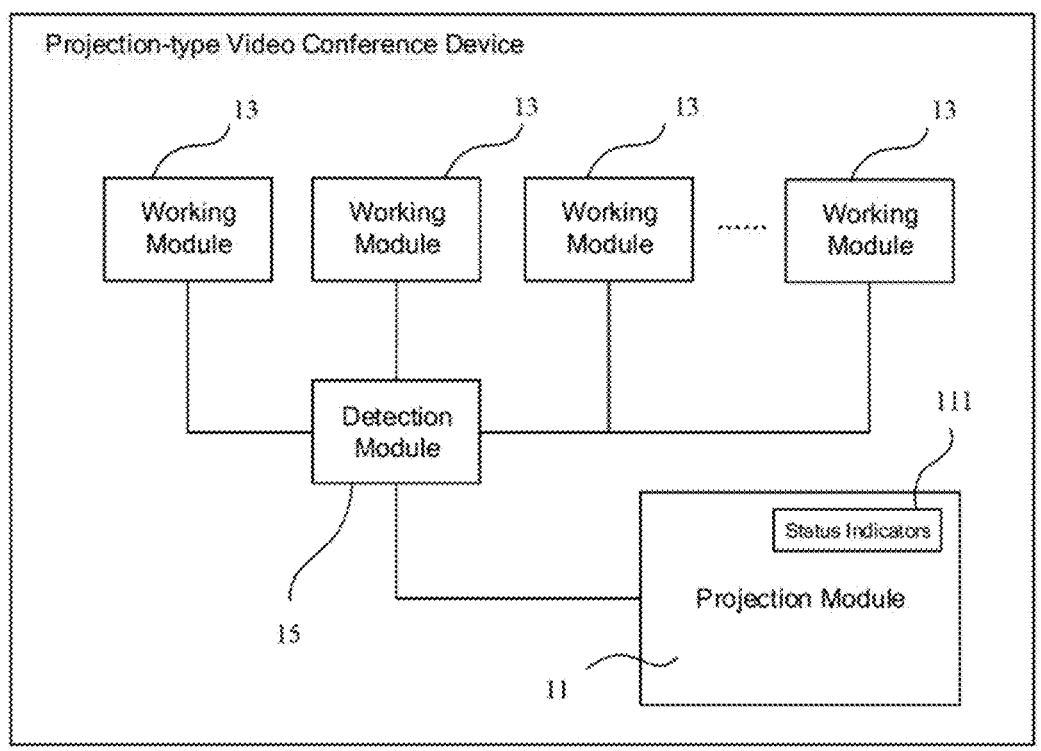
FIG. 1 is a schematic structural diagram illustrating a first embodiment of a video conference device according to the present disclosure.

Referring to FIG. 1 which is a schematic structural diagram illustrating a first embodiment of a video conference device according to the present disclosure, the projection-type video conference device 10 may include a projection assembly 11, a plurality of working modules 13 and a detection module 15.

The projection module 11 may be configured to project a video signal of a conference scene as an projection image on a screen. The term of "video signal" herein may refer to a signal of any visual information such as a picture, a video, a screen image, a document, or the like. For example, the projection module 11 can display an input signal such as a video, an image, a file or the like from a computer or an external terminal device. The projection module 11 can also display a panoramic video captured by the camera module or the video of the counterpart's meeting scene sent by the counterpart's conference device during the video conference. The conference projection image to be displayed can be selected for example on a conference system application installed in the computer and/or an external electronic terminal.

Specifically, in the present embodiment, the projection module 11 adopts a semiconductor light source such as a laser light source or an LED light source. Since laser light has advantages such as high brightness, wide color gamut, true color, strong directionality, and long service life, in this embodiment, the projection module 11 adopts a projection technology based on a laser light source, and the output brightness can reach more than 500 lumens. The output video of the video conference device 10 reaches a resolution above 1080P, which can be used to project the video of the other party in a video conference or realize screen sharing of electronic terminal equipment such as computers/mobile phones.

It can be understood that the projection module 11 is not limited to using a projection technology based on a laser light source, and can also use a projection technology based on an LED light source.

Figure 2:
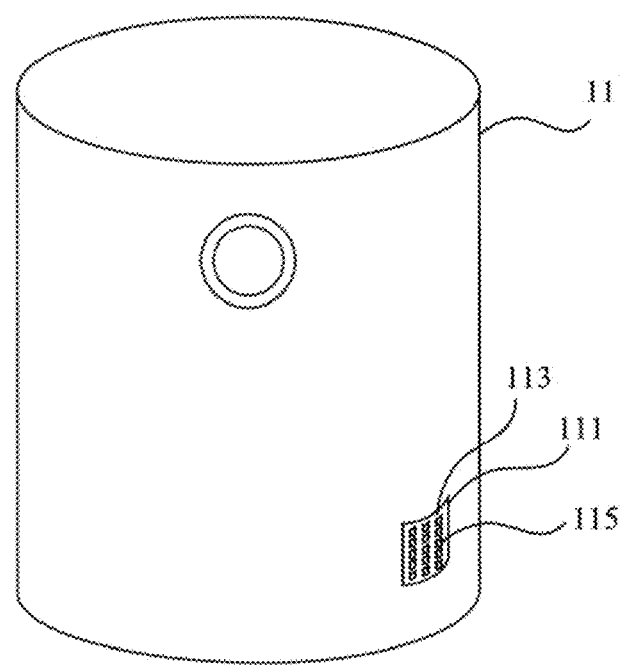
FIG. 2 is a schematic structural diagram illustrating a projection module in the video conference device as shown in FIG. 1.

Please also refer to FIG. 2. In this embodiment, the housing of the projection module 11 is provided with one or more status indicators 11. As an example, the one or more status indicators 111 may include one LED light or an LED light array 113 which is composed of a plurality of LED lights 115 of different colors in an array. The LED light array 113 can realize combinations of light beams, colors and/or patterns with different visual effects, and these combinations are used to characterize working statuses of each working module 13.

Each working module 13 can provide different services for the video conference device and achieve different functions. Specifically, the plurality of working modules 10 include at least one of a camera module, an audio input/ output module, a communication module, a battery module, a cloud service system, a storage module, and the like.

Among the plurality of working modules 13, the camera module is configured to realize capture or recording of an image and/or a video. In this embodiment, the camera module is used to obtain a panoramic video of the conference scene. The camera module may include a camera, which may be a wide-angle lens. It can be a 360-degree panoramic camera or a camera that covers a partial scene. Two or three wide-angle lenses can be used. Each wide-angle lens supports higher resolutions such as 1080P or 4K. The video collected by all wide-angle lenses is jointed by means of software. It can generate a video of 360-degree scene and with a high definition, and the high-definition panoramic video is kept at 1080P. During the conference, by performing artificial intelligence (AI) image analysis on the panoramic video, all participants in the conference can be tracked in real time and the speakers can be located and identified. The camera module can transmit the collected image and/or video information to the projection module 11 which performs a projection and display.

The audio input/output module is configured to collect and output voice signals. Specifically, the audio input/output module may include an audio input unit and an audio output unit. The audio input unit can be a microphone, which can be a microphone array surrounding in 360 degrees in the horizontal direction. For example, it can adopt an array of 6 digital-MEMS (Micro Electro Mechanical System)-based microphones, which are evenly and circumferentially distributed in the horizontal plane and each has a function of Pulse Density Modulation (PDM), for interaction with near and far fields; alternatively, it may adopt an array of 6+1 microphones, with one microphone located in the center to capture far-field audio. The audio output unit can be speakers or sound equipment, and can use 360-degree-surrounding sound equipment or local directional sound equipment.

The communication module may be configured to realize network communication, data transmission and the like. Specifically, the communication module can include a wireless communication unit, which can be connected to the Internet through WIFI, and connected to video conferences with the assistance of the cloud service system. The cloud service system can also be connected to Internet. It needs to be noted that the cloud service system is an online service based on cloud computing and provided through the internet, and usually provides dynamic and easily expandable personalized services through the Internet. It can be understood that the communication module may also include a communication interface unit.

The battery module is configured to supply power to the projection video conference device 10, specifically, to provide each working module 13 with voltage and current required for operation. In this embodiment, the battery module includes a rechargeable battery that supplies power to the projection video conference device 10. The detection module 17 detects the battery level (remaining power) of the rechargeable battery in real time which is indicated by the status indicators 111 in the form of a lamp post, and the lamp post is simultaneously displayed in real time by the projection module 11.

Specifically, when the detection module 17 detects in real time that the remaining power of the rechargeable battery reaches a preset threshold (for example, the remaining power of the rechargeable battery reaches 30%), the projection module 11 reduces the brightness of projection image of the current conference video. Therefore, it is possible to effectively realize the power warning and reminder function for the participants in the conference. On the other hand, reducing the brightness of the current projection image of the conference video, that is, correspondingly reducing the supply current to the projection module 11, can extend the life time of the remaining power of the rechargeable battery to a certain extent.

Alternatively, the rechargeable battery is a detachable battery, which is more convenient to replace and carry.

The cloud service system 20 is a software service system running in the cloud, which may be configured to provide software services to the video conference device 10. The cloud service system may support connection and management for videos. The cloud service system may provide multiple business modules. And in the embodiments of the present disclosure, the cloud service system may be implemented by one or more servers. The services provided by the cloud service system may include device access and management services, video conference connection service, video stream transferring service, video conference storage service, user management and authentication services, third-party integration and interface services, marketing and advertising services, subscription and charging services as well as event pushing service.

The storage module is configured to store conference videos and enable the software application to replay the recorded conference videos. In an implementation, the video conference device 10 may upload the audio stream and video stream of the current conference to the storage module upon receiving a video conference storage command, and the storage module may encode and merge the audio stream and the video stream, and convert them into a playable video file for storage.

It can be understood that the LE) light array 113 uses different combinations of light beams, colors and/or patterns with different visual effects to characterize the current working status of each working module 13, which may include: characterizing working statuses of the camera module such as on/off status, taking pictures, recording, etc.; characterizing working statuses of the audio input/output module such as volume, mute, and voice dialogue; characterizing working statuses of the communication module such as wireless connection/disconnection, video conference connection/disconnection, and communication interface connection/disconnection; characterizing working statuses of the battery module such as power level and charging status; characterizing working statuses of the cloud service system such as connection/disconnection; characterizing working statuses of the storage module such as data storage/export.

For example, a green LED flashing slowly indicates that the wireless connection is currently in progress, and a steady green LED indicates that the wireless connection is successful and the Internet Protocol (IP) address is successfully obtained. The specific color and/or pattern can be pre-designed and selected and set according to usage requirements.

It can be understood that the plurality of working modules 10 are not limited to the specific modules mentioned in this embodiment, and may also be others, such as a heat dissipation module for heat dissipation, a rights management module for safety protection, and so on. It is understood that the projection module 11 can also be considered as a working module of the video conference device 10, and the detection module 15 can also detect and acquire the working status of the projection module 11.

The detection device 15 is configured to detect the working statuses of the plurality of working modules 13, and connected to the plurality of working modules 13 respectively. The detection module 15 detects the working statuses of the plurality of working modules 13 in real time which are then indicated by the one or more status indicators 111.

Figure 3:
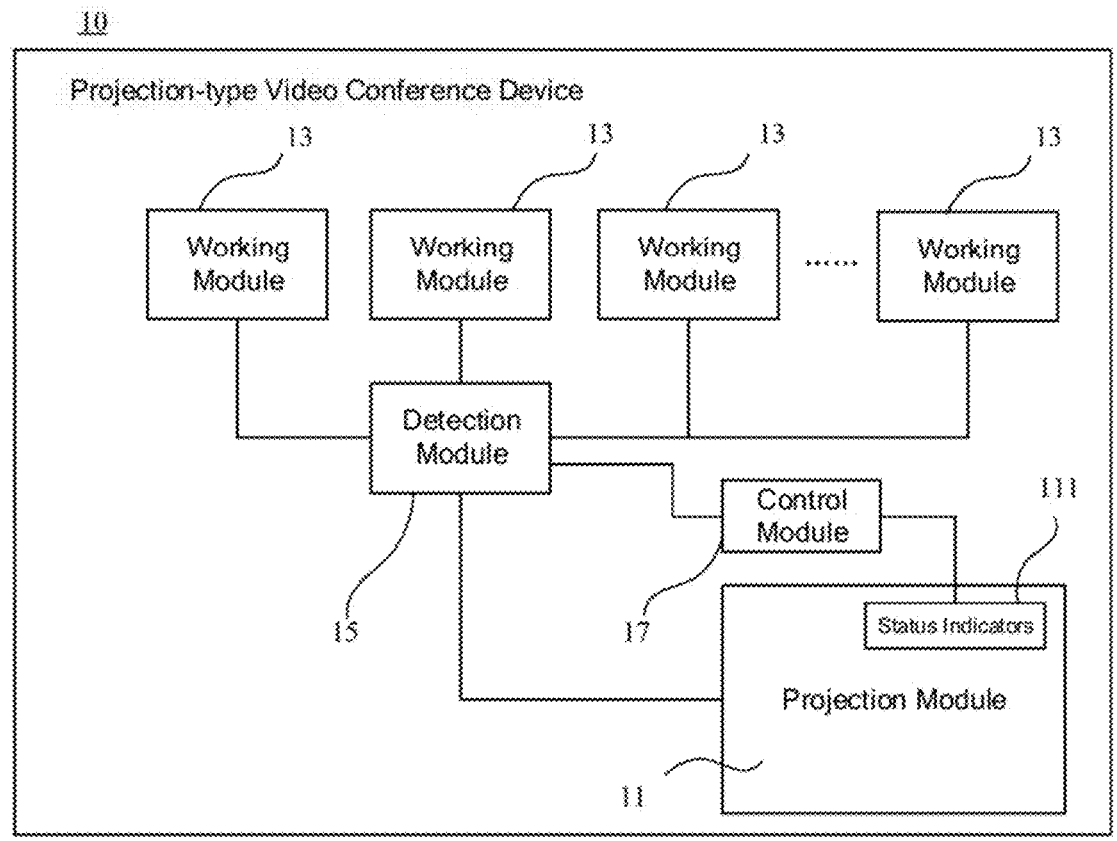
FIG. 3 is a schematic structural diagram illustrating a second embodiment of a video conference device according to the present disclosure.

Referring to FIG. 3, in the second embodiment of the present application, the projection-type video conference device 10 further includes a control module 17, which is connected to the status indicators 111 and the detection module 15 respectively. The detection module 15 detects and obtains the working status of each working module 13 in real time and transmits the corresponding working status signal to the control module 17. The control module 17 controls, based on the working status signal, the status indicators 111 to indicate the working statuses of the plurality of working modules through light beams, colors and/or patterns with different visual effects. Thus, through indicating, by the status indicators 111, the working statuses of the plurality of working modules 13 by means of light beams, colors and/or patterns with different visual effects, the participants in the video conference can better understand the statuses of the projection-type video conference device 10.

Figure 4:
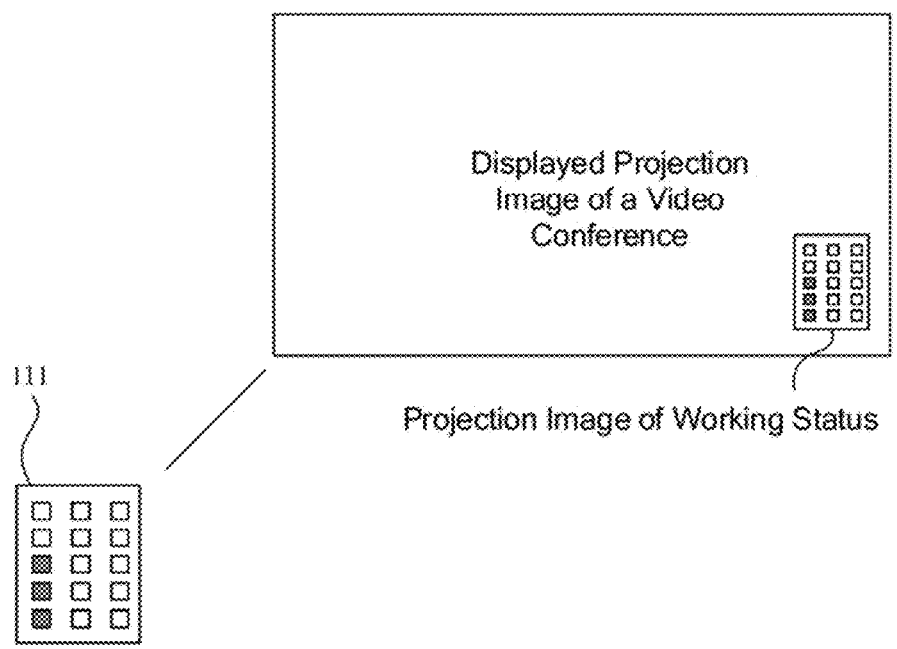
FIG. 4 is a schematic diagram illustrating a working status of the video conference device according to the present disclosure.

Please refer to FIG. 4 together. Optionally, the projection module 11 may simultaneously project and display the working statuses of the plurality of working modules 13 in real time. Thus, when the participants in the conference focus on the projection display screen (or projection screen), the working status of the projection-type video conference device 10 can be known in time by the participants through the working statuses of the plurality of work modules 13 displayed in the projection display screen. In order not to affect the current video conference projection display screen, the projection image of the working status can be displayed in a certain area in the form of a floating window.

In this application, the projection-type video conference device 10 has a working status indication/reminder function, which is convenient for participants in the video conference process to understand the working status of the video conference device in real time, and improve the use experience of the video conference device.

The foregoing are only examples of this disclosure, and do not limit the scope of the disclosure. Any equivalent structure or equivalent process variants made on the basis of the contents of the specification and drawings of this disclosure, or direct or indirect application to other related technical fields, should all be included in the scope protection of this disclosure.

What is claimed is:

1. A projection-type video conference device, comprising:
   a projection module configured to project a video signal of a video conference, and comprising a housing with one or more status indicators thereon;
   a plurality of working modules configured to provide different services for the video conference; and
   a detection module configured to detect working statuses of the plurality of working modules, the detection module being connected to the plurality of working modules respectively,
   wherein the detection module detects the working statuses of the plurality of working modules in real time, and the working statuses are indicated by the one or more status indicators,
   wherein the plurality of working modules comprise at least one of a camera module, an audio input and output module, a communication module, a battery module, a cloud service system, and a storage module;
   the projection module is further configured to project and display, on a projection display screen, the working statuses of the plurality of working modules in real time simultaneously with a projection image of the video signal of the video conference, in such a manner that a projection image of the working statuses of the plurality of working modules are displayed, in a form of a floating window, on the projection image of the video signal of the video conference at a certain area;

the working statuses of the plurality of working modules projected on the projection display screen comprises at least one of: on/off status, taking pictures status, and recording status of the camera module; volume status, mute status, and voice dialogue status of the audio input/output module; wireless connection/disconnection status, video conference connection/disconnection status, and communication interface connection/disconnection status of the communication module; power level status and charging status of the battery module; connection/disconnection status of the cloud service system; and data storage/export of the storage module; and the cloud service system is configured to provide services at least comprising: device access and management services, video conference connection service, video stream transferring service, video conference storage service, user management and authentication services, third-party integration and interface services, marketing and advertising services, subscription and charging services as well as event pushing service.

2. The projection-type video conference device of claim 1, further comprising:

a control module connected to the detection module, wherein the detection module transmits information on the working statuses of the plurality of working modules to the control module, and the control module controls the one or more status indicators based on the information to indicate different working statuses via light beams, colors or patterns with different visual effects.

3. The projection-type video conference device of claim 2, wherein the battery module comprises a rechargeable battery that supplies power to the projection-type video conference device, the detection module detects battery status of the rechargeable battery in real time, and the battery status is indicated in a form of a lamp post by the one or more status indicators.

4. The projection-type video conference device of claim 3, wherein when the detection module detects in real time that a remaining power of the rechargeable battery reaches a preset threshold, the control module controls the projection module to reduce brightness of a displayed image of the video conference video.

5. The projection-type video conference device of claim 3, wherein the rechargeable battery is a detachable battery.

6. The projection-type video conference device of claim 1, wherein the one or more status indicators comprise an LED light array, and the LED light array comprises a plurality of LED lights of different colors.

7. The projection-type video conference device of claim 1, wherein the projection module uses a semiconductor light source.

8. The projection-type video conference device of claim 1, wherein the audio input and output module comprises an array of 6 digital-MEMS-based microphones, and the 6 microphones are evenly and circumferentially distributed in a horizontal plane and each has a function of Pulse Density Modulation.

9. The projection-type video conference device of claim 1, wherein the audio input and output module comprises an array of 6+1 digital-MEMS-based microphones, one of the microphones is located in the center to capture far-field audio, other 6 microphones are evenly and circumferentially distributed in a horizontal plane, and each of the microphones has a function of Pulse Density Modulation.

10. The projection-type video conference device of claim 1, wherein the camera module is configured to obtain a panoramic video of a conference scene.

11. A projection-type video conference device, comprising:

a projection module, configured to project a video signal of a video conference, and comprising a housing with one or more status indicators provided thereon;

a plurality of working modules, comprising at least one of a camera module, an audio input and output module, a communication module, a battery module, a cloud service system, and a storage module; and a detection module, connected to each of the plurality of working modules, and configured to detect working statuses of the plurality of working modules, wherein the detected working statuses are indicated by the one or more status indicators on the projection module, the projection module is further configured to simultaneously project, on a projection display screen, the working statuses of the plurality of working modules and the video signal of the video conference in real time, in such a manner that a projection image of the working statuses of the plurality of working modules are displayed, in form of a floating window, on a projection image of the video signal of the video conference; and the working statuses of the plurality of working modules projected on the projection display screen comprises at least one of: on/off status, taking pictures status, and recording status of the camera module; volume status, mute status, and voice dialogue status of the audio input/output module; wireless connection/disconnection status, video conference connection/disconnection status, and communication interface connection/disconnection status of the communication module; power level status and charging status of the battery module; connection/disconnection status of the cloud service system; and data storage/export of the storage module.

12. The projection-type video conference device of claim 11, wherein the cloud service system is configured to provide services at least comprising: device access and management services, video conference connection service, video stream transferring service, video conference storage service, user management and authentication services, third-party integration and interface services, marketing and advertising services, subscription and charging services as well as event pushing service.

* * * * *